United States Patent
Desai et al.

(10) Patent No.: US 8,013,726 B2
(45) Date of Patent: Sep. 6, 2011

(54) ADAPTIVE SWITCHING RECEIVER SLICE LEVEL

(75) Inventors: Tejas B. Desai, Troy, MI (US); Patricia Kachouh, Sterling Heights, MI (US); Gerald Ostrander, Davison, MI (US); Scott Lucy, Lake Orion, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 382 days.

(21) Appl. No.: 12/263,724

(22) Filed: Nov. 3, 2008

(65) Prior Publication Data

US 2009/0121858 A1    May 14, 2009

Related U.S. Application Data

(60) Provisional application No. 61/001,558, filed on Nov. 2, 2007.

(51) Int. Cl.
*B60C 23/00* (2006.01)
(52) U.S. Cl. .............. 340/447; 340/426.1; 340/430; 340/426.13; 340/539.1; 340/539.11
(58) Field of Classification Search .......... 340/447, 340/426.1, 430, 425.5, 426.13, 825.3, 442, 340/825.69, 825.71, 539.1, 539.11; 307/10.2, 10.1, 10.3, 10.8
See application file for complete search history.

(56) References Cited

U.S. PATENT DOCUMENTS

| | | | | |
|---|---|---|---|---|
| 6,420,967 | B1 * | 7/2002 | Ghabra et al. | 340/447 |
| 6,650,236 | B2 * | 11/2003 | Ghabra et al. | 340/447 |
| 6,696,935 | B2 * | 2/2004 | Bonardi et al. | 340/447 |
| 2002/0101335 | A1 * | 8/2002 | Ghabra et al. | 340/426 |
| 2002/0149477 | A1 | 10/2002 | Desai et al. | |
| 2002/0171537 | A1 * | 11/2002 | Ghabra et al. | 340/426 |
| 2004/0124912 | A1 | 7/2004 | Desai et al. | |
| 2007/0021082 | A1 | 1/2007 | Okumura et al. | |

OTHER PUBLICATIONS

International Search Report and Written Opinion mailed Jul. 1, 2009.
International Preliminary Report on Patentability mailed on May 14, 2010.

* cited by examiner

*Primary Examiner* — Daryl Pope

(57) ABSTRACT

A disclosed example receiver for receiving transmissions and data for both a remote keyless entry (RKE) system and a tire pressure monitoring (TPM) system tailors the data slice level to the characteristics unique to each of the RKE transmissions and the TPM transmissions.

15 Claims, 4 Drawing Sheets

ADAPTIVE SWITCHING RECEIVER SLICE LEVEL

CROSS REFERENCE TO RELATED APPLICATION

The application claims priority to U.S. Provisional Application No. 61/001,558 which was filed on Nov. 2, 2007.

BACKGROUND OF THE INVENTION

A receiver module for receiving radio frequency (RF) signals for a remote keyless entry system (RKE) and a tire pressure monitoring (TPM) is designed to receive messages for each system according to differing protocols. A dedicated receiver that receives transmissions for one system can be optimized relative to the nature of the expected transmission. This includes the optimization of noise cancelling features along with response times that are tailored to the specific system. However, a receiver that is utilized for receiving transmissions from different systems with different protocols cannot be optimized for one system. RKE transmissions from a key fob have different characteristics than transmissions from a TPM sensor rotating on a vehicle wheel. Accordingly, it is desirable to design and develop a receiver module that can adapt to incoming transmissions to improve operation and receipt of transmissions of different protocols from different systems.

SUMMARY OF THE INVENTION

A disclosed example receiver for receiving transmissions and data for both a remote keyless entry (RKE) system and a tire pressure monitoring (TPM) system switches between modes of operation depending on the expected one of an RKE transmission and a TPM transmission that is to be received.

The example disclosed receiver tailors the data slice level to the characteristics unique to each of the RKE transmissions and the TPM transmissions. RKE transmissions are expected when a vehicle is not moving and TPM transmissions are expected when the vehicle is moving. The TPM sensors are disposed in the rotating wheels and therefore TPM transmissions vary in signal strength relative to a rotational position of the specific vehicle wheel. The greatest concern in receiving an RKE transmission is the separation of noise and other ambient transmissions from the desired RKE data transmission. Therefore, a data slice level indicative of high signal strength is set at a high level to provide the desired separation from other undesired signals.

In contrast, the TPM transmissions vary in signal strength with the position of the wheel. The varying signal strength is received best with a lower slice data level that accommodates such signal strength variation. Accordingly, the example receiver improves operations by switching between data slice levels to adapt to the expected incoming signal.

These and other features of the present invention can be best understood from the following specification and drawings, the following of which is a brief description.

DETAILED DESCRIPTION OF THE PREFERRED EMBODIMENT

Figure 1:
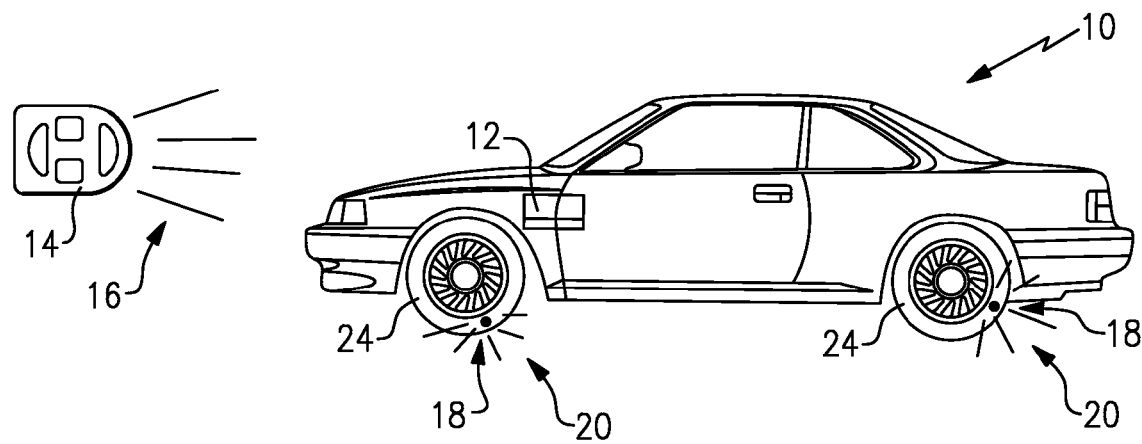
FIG. 1 is a schematic drawing of a vehicle including a receiver for receiving remote keyless entry transmissions and tire pressure monitoring transmissions.

Referring to FIG. 1, a vehicle 10 includes a receiver 12 for receiving transmissions and data for both a remote keyless entry (RKE) system and a tire pressure monitoring (TPM) system. The receiver 12 switches between modes of operation depending on the expected one of an RKE transmission 16 and a TPM transmission 20 that is to be received. The receiver 12 tailors the data slice level utilized to verify that a valid signal is received. The data slice level is set at a level tailored for the characteristics unique to each of the RKE transmissions 16 and the TPM transmissions 20.

RKE transmissions from a key fob 14 or other active or passive transmission device are utilized to communicate a code with the vehicle 10. The specific code verifies the authenticity of the transmission to prevent unauthorized access to the vehicle. Upon receipt of a valid and authenticated signal, the vehicle will allow doors to be unlocked and may also perform other functions such as for example, adjusting seat and mirrors to preset positions. RKE transmissions are expected when a vehicle is not moving.

TPM transmissions from tire pressure sensors 18 disposed within each of the vehicle tires 24 send information indicative of conditions within the tires to the vehicle through to the receiver. TPM transmissions 20 are sent at times dependant on desired operational parameters. Such parameters will often include sending more frequently signals when it is determined that the vehicle is moving. With the vehicle in a parked condition, the transmissions from the TPM sensors 18 are received at constant signal strength. However, when the vehicle is moving, the TPM sensors 18 rotate with the rotating wheels 24 that in turn cause the TPM transmissions 20 to vary in signal strength relative to a rotational position of the specific vehicle wheel 24.

Transmissions including data are detected once they attain a desired signal strength or level. The signal level is determined for incoming signals to obtain the desired information while also separating out surrounding signals and noise. Ambient signals and electronic noise can prevent clear reception of both RKE and TPM transmissions.

RKE transmissions are received when the key fob 14 and vehicle are both relatively stationary and therefore signal strength does not vary significantly. The greatest concern in receiving an RKE transmission is the separation of noise and other ambient transmissions from the desired RKE data transmission. Therefore, a data slice level is set at a high level to provide the desired separation from other undesired signals. In contrast, TPM transmissions 20 that originates from a moving wheel 24 result in a signal strength that varies with the position of the wheel 24. The varying signal strength is received best with a lower data slice level that accommodates such signal strength variation. Accordingly, the example receiver 12 switches between data slice levels to adapt to the expected incoming signal.

Figure 2:
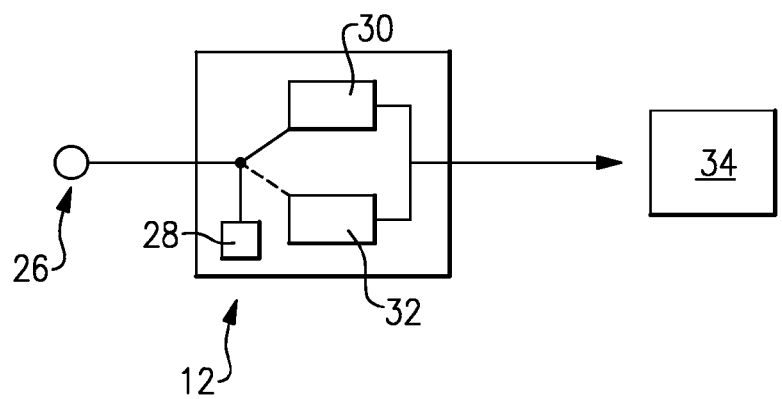
FIG. 2 is a schematic drawing of an example receiver for receiving remote keyless entry transmissions and tire pressure monitoring transmissions.

Referring to FIG. 2, the example adaptive receiver 12 is shown schematically and includes an antenna 26 that receives incoming transmissions. The receiver 12 includes a controller 28 that switches between a first mode 30 providing a first data slice level, and a second mode 32 that provides a second data slice level different than the first mode. Data from the receiver 12 is forwarded on to the proper vehicle system schematically indicated at 34.

As appreciated the first mode 30 and the second mode 32 can be separate circuits for providing the desired data slice levels, and may also represent a switching of specific components on and off within the receiver 12 that result in the desired change of data slice levels. It is within the contemplation of this invention to incorporate entirely different circuits, and/or switch on and off specific components to provide the desired different slice level for each of the first and second modes 30, 32. Further, it also within the contemplation of this invention to utilize software to provide the change in receiver slice levels.

Figure 3:
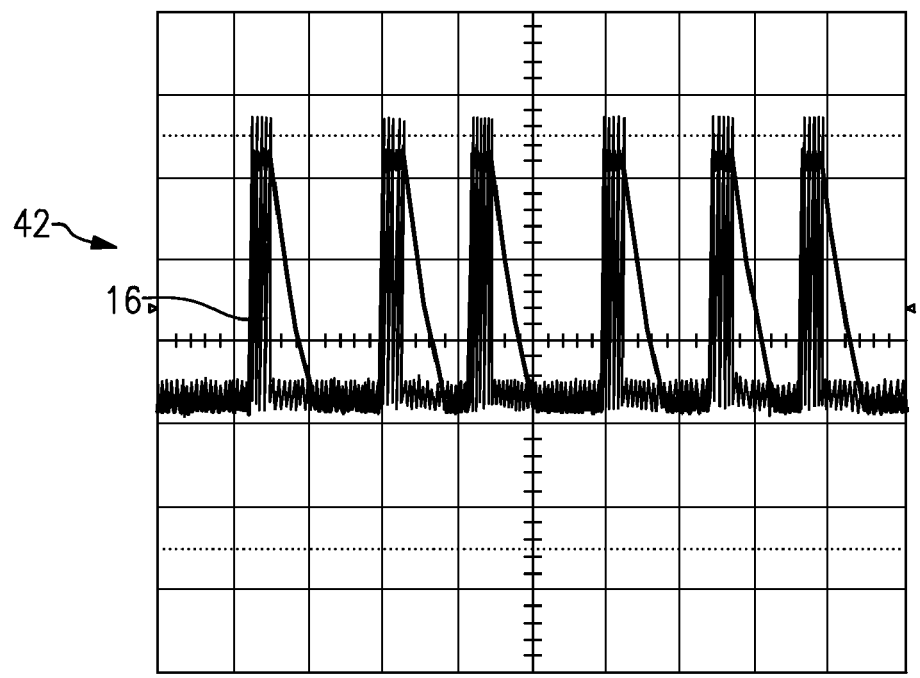
FIG. 3, is a schematic drawing of an example slice level for an RKE transmission.
Figure 4:
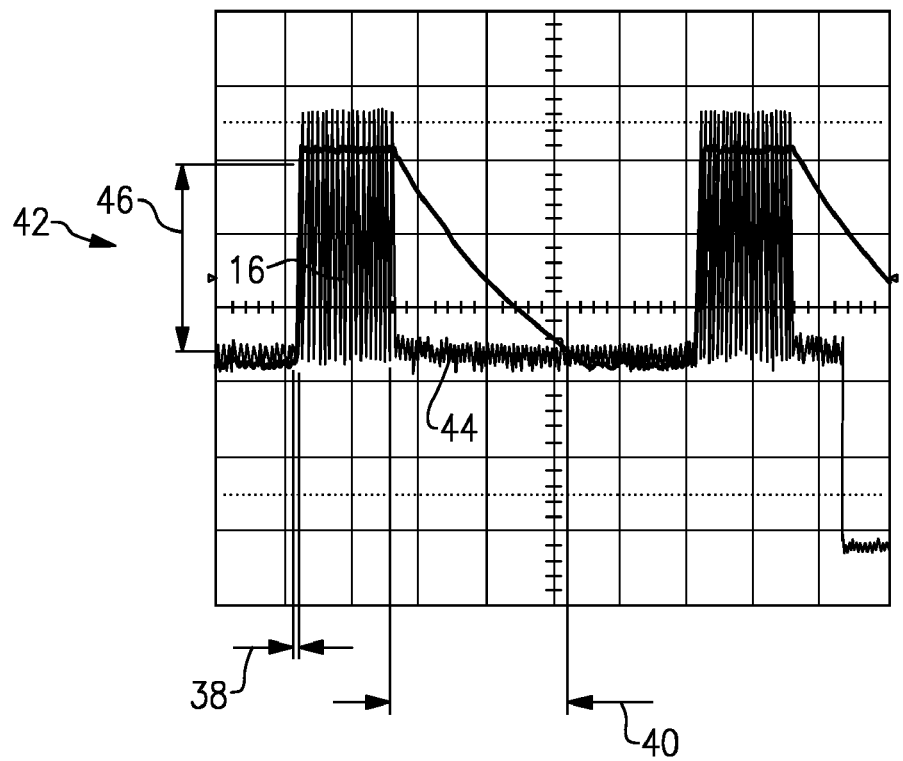
FIG. 4 is an enlarged view of the example data slice level for the RKE transmission shown in FIG. 3.

Referring to FIGS. 3 and 4, a transmission plot of an RKE transmission is illustrated with the data slice level provided by the first mode 30 of the receiver. The example first mode is a peak data slicer that sets the recognition value to a percentage of the signal strength. This level is indicated at 46. This level 46 is a relatively high percentage of the signal level in order to separate a valid signal from noise indicated at 44. The rise time is indicated at 38 and is also an adjustable parameter along with decay time 40. The rise time 38 is set to provide a fast response time. The decay time 40 is set at a rate determined to provide a time that prevents interference by ambient electronic signals. The decay time 40 is also determined with respect to the next expected data transmission packet. Accordingly, the peak data slice configuration as provided by the first mode 30, provides the desired immunity to ambient electronic noise.

Figure 5:
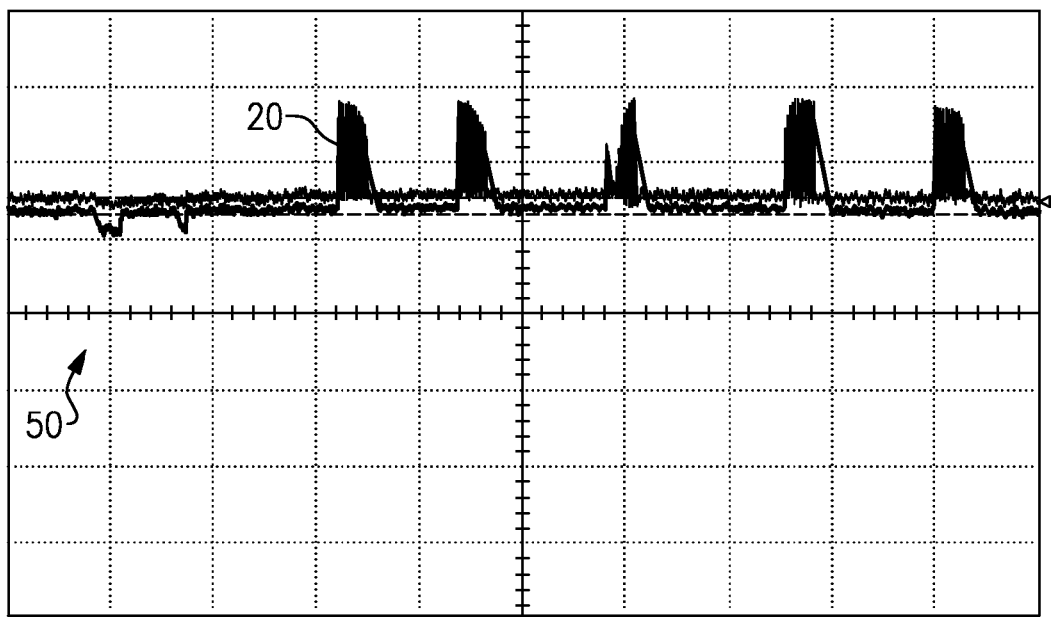
FIG. 5 is a schematic drawing of an example data slice level for a TPM transmission.
Figure 6:
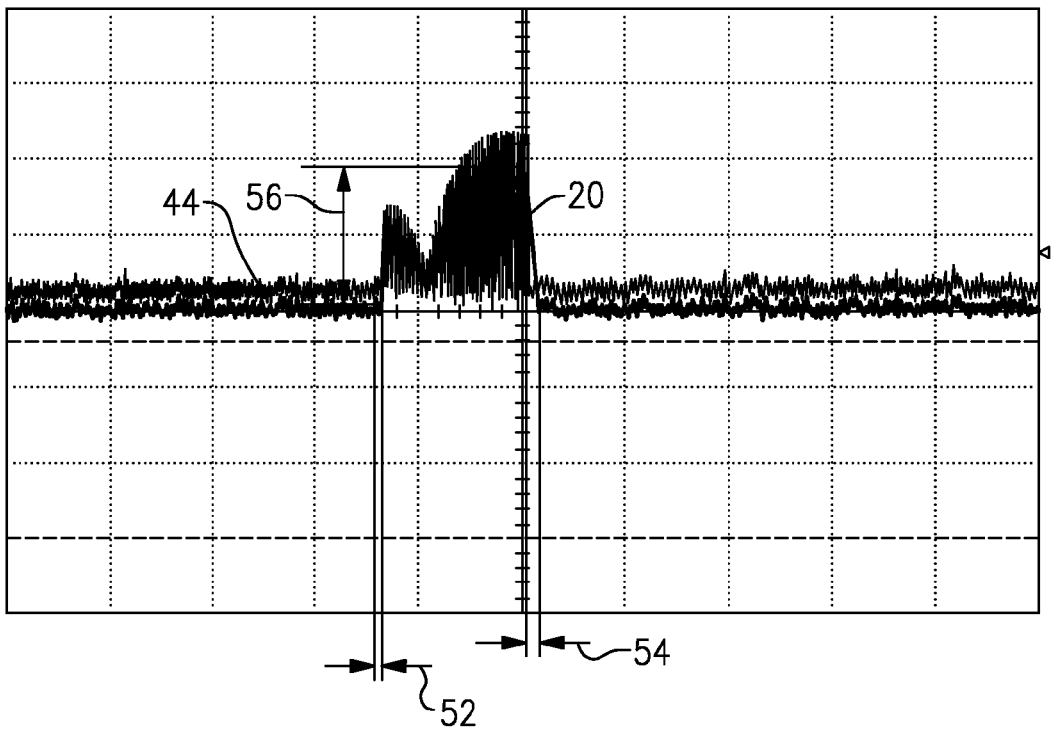
FIG. 6 is an enlarged view of the example data slice level for the TPM transmission shown in FIG. 5.

Referring to FIGS. 5 and 6, the second mode 32 also utilizes a peak data slicer with the threshold 56 indicating receipt of a proper signal being a percentage of the signal strength. The rise time 52 is similar or the same as the rise time 38 provided by the first mode 30. The decay time 54 is set to a reduced time as compared to the decay time 40 provided in the first mode 30. The faster decay time 54 is provided to better accommodate the variations in amplitude modulations in the signal strength caused by relative movement between the TPM sensors 18 and the receiver 12.

Figure 7:
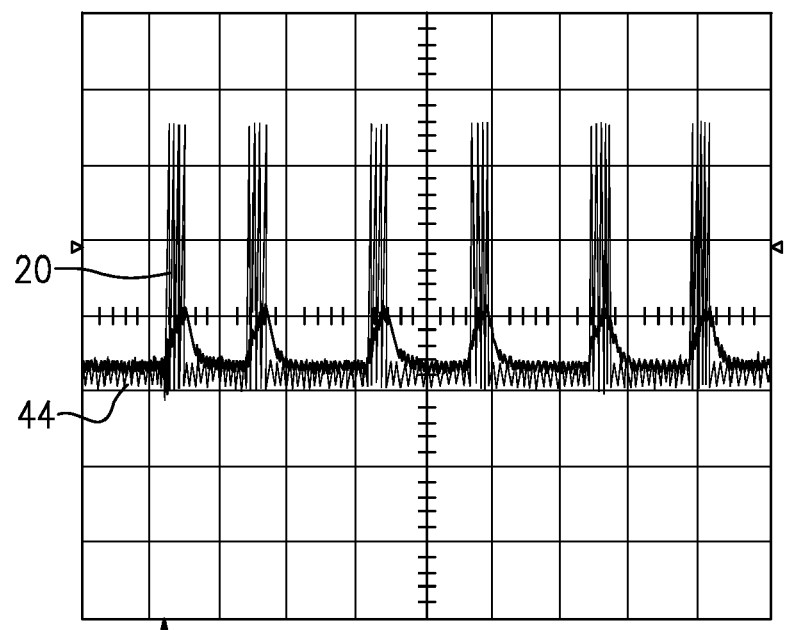
FIG. 7 is a schematic drawing of another example of another data slice level for a TPM transmission.
Figure 8:
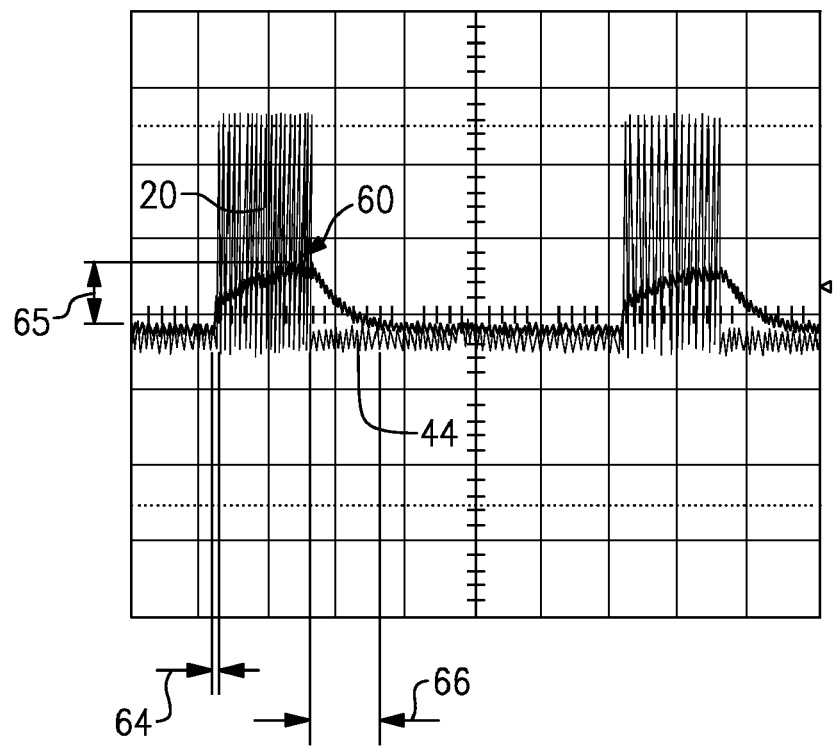
FIG. 8 is an enlarged view of the example slice level shown in FIG. 7.

Referring to FIGS. 7 and 8, a slow average data slice configuration and protocol can be utilized for the receipt of the TPM transmissions 20 instead, or in addition to the second mode 32. The slow average data slicer provides the lower threshold limit 60 as a long term filtered average of the signal strength of a short term data transmission. The threshold limit 60 is initially set at the start of the data transmission at a fixed offset 65 above the noise floor 44. The long term filter then provides a slow increase of the threshold during the duration 64 of the data transmission as well as a slower fall time 66. The threshold limit 60 being determined by a filtered average and not a percentage of signal strength to accommodate the varying signal strengths received from the rotating vehicle tires.

The example receiver 12 operates in a default condition having the first mode 30 engaged to receive RKE transmissions 16. The first mode 30 provides the example peak data slicer limits as shown in FIGS. 3 and 4. The threshold value 46 is high to provide a desired level of noise immunity. The receiver 12 remains in the first mode 30 until such time as the controller 28 detects a defined condition. The defined condition can be any vehicle operating parameter or condition that would indicate that the receiver 12 should expect to receive either the RKE transmission or the TPM transmission.

The RKE transmission is most relevant when the vehicle is parked and not moving. As appreciated, it is of greater priority to receive the RKE transmission when the vehicle is parked then any other signal, including the TPM transmission. When the vehicle is not moving, the TPM transmissions 20 will not vary in signal strength, and therefore the data slice level corresponding with the first mode can be utilized to receive TPM transmissions from non-moving sensors 18. However, once the vehicle begins moving, it becomes unlikely that an RKE signal will be received. Further, the TPM transmissions will experience variations in signal strength that require a different data slice level and response characteristics to best receive the desired data.

In this example, once the controller 28 indicates that the vehicle is moving, the receiver 12 is switched to operate in the second mode 32 using the fast peak data slicer protocol as shown in FIGS. 5 and 6. The lower threshold value 56 and faster decay time 54 tailor the receiver 12 to better recognize and validate incoming TPM transmissions 20.

Alternatively, the second mode 32 can utilize the slow average data slicer as shown in FIGS. 7 and 8. Either, the fast peak data slicer as included in FIGS. 5 and 6 or the slow average data slicer can be utilized for receipt of TPM transmissions 20 to accommodate the variations in signal strength caused by the rotating wheels.

Once the vehicle returns to a parked or non-moving condition, the receiver 12 is returned to operate in the first mode 30 in the expectation that an RKE transmission will be received. Additionally, the receiver 12 can switch between the first mode 30 and the second mode 32 responsive to receipt of the specific data signal. If an RKE transmission 16 is received while the receiver 12 is in the second mode 32, the controller 28 can recognize receipt and switch to the first mode 30 to better enable receipt and verification. Further, when in the first mode 30 awaiting an RKE transmission 16, the controller 28 can switch to the second mode 32 to improve operation and receipt of the TPM transmission 20.

Accordingly, the example receiver 12 is adaptive to optimize receiver operation by tailoring the slice level and operation to the incoming data transmission. The example receiver 12 includes first and second modes that optimize receipt of data transmissions. Further, more than two modes could be provided to receive and accommodate additional transmission protocols.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A receiver assembly for receiving transmissions from a remote keyless entry (RKE) system and a tire pressure monitoring (TPM) system, the receiver assembly comprising:
   a data slicer module including a first mode of operation for receiving a transmission for the RKE system and a second mode of operation different than the first mode of operation for receiving a transmission for the TPM system; and
   a controller for switching the data slicer between the first mode and the second mode responsive to an expected transmission from one of the RKE and TPM systems, wherein the controller switches the data slicer between the first mode of operation and the second mode of operation based on a speed of a vehicle in which the receiver assembly is installed.

2. The receiver assembly as recited in claim 1, wherein the first mode of operation of the data slicer comprises a first slice level, and the second mode of operation comprises a second slice level different than the first slice level.

3. The receiver assembly as recited in claim 2, wherein the first mode includes a first response time and a second decay time tailored to receipt of a desired RKE transmission and the second mode includes a second response time and a second decay time tailored to a desired TPM transmission, wherein the second decay time is faster than the first decay time.

4. The receiver assembly as recited in claim 1, wherein the first mode comprises a slow peak data slicer having a first decay time and the second mode comprises a fast peak data slicer having a second decay time faster than the first decay time.

5. The receiver assembly as recited in claim 1, wherein the first mode comprises a peak data slicer and the second mode comprises an average data slicer.

6. The receiver assembly as recited in claim 1, wherein the controller switches the data slicer to the second mode of operation responsive to a condition indicating that a vehicle in which the receiver assembly is installed is moving.

7. The receiver assembly as recited in claim 1, wherein the controller switches the data slicer to the second mode of operation responsive to movement of a vehicle above a desired speed.

8. A receiver assembly for receiving transmissions from a remote keyless entry (RKE) system and a tire pressure monitoring (TPM) system, the receiver assembly comprising:

a data slicer module including a first mode of operation for receiving a transmission for the RKE system and a second mode of operation different than the first mode of operation for receiving a transmission for the TPM system; and a controller for switching the data slicer between the first mode and the second mode responsive to an expected transmission from one of the RKE and TPM systems, wherein the controller switches the data slicer to the first mode of operation responsive to a condition indicating that a vehicle in which the receiver assembly is installed is not moving.

9. A method of receiving transmissions from a remote keyless entry (RKE) system and a tire pressure monitoring (TPM) system comprising the steps of:

determining which of a RKE transmission and a TPM transmission that is expected; and modifying the slice level of a receiver responsive to which of the RKE and TPM transmissions are expected, wherein the step of determining which of the RKE and TPM transmissions are expected includes determining a vehicle speed and expecting one of the RKE and TPM transmissions based on vehicle speed.

10. The method as recited in claim 9, wherein the slice level of the receiver is switched to a first slice level responsive to a determination that an RKE transmission is expected.

11. The method as recited in claim 10, wherein the slice level of the receiver is switched to a second slice level responsive to a determination that an TPM transmission is expected.

12. The method as recited in claim 9, wherein the slice level is determined as a percentage of the signal level of the received one of the RKE and TPM transmissions, and the decay time is switched responsive to the determination of which of the RKE and TPM transmissions are expected.

13. The method as recited in claim 12, wherein a first decay time is utilized responsive to a determined expectation of receiving an RKE transmission, and a second decay time shorter than the first decay time is utilized responsive to a determined expectation of a TPM transmission.

14. The method as recited in claim 9, wherein the slice level is lowered and the decay time is reduced responsive to an expectation of receiving a TPM transmission.

15. The method as recited in claim 14, wherein the slice level is maintained at a level higher than that utilized for a TPM transmission and the decay time is increased relative to the decay time utilized for a TPM transmission responsive to an expectation of an RKE transmission.

* * * * *